(12) United States Patent
Zhang et al.

(10) Patent No.: US 10,700,981 B2
(45) Date of Patent: Jun. 30, 2020

(54) PROCESSING METHOD FOR SERVICE FLOW PACKET, AND DEVICE

(71) Applicant: Huawei Technologies Co., Ltd., Shenzhen, Guangdong (CN)

(72) Inventors: Wei Zhang, Shanghai (CN); Chenghui Peng, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 102 days.

(21) Appl. No.: 15/664,274

(22) Filed: Jul. 31, 2017

(65) Prior Publication Data

US 2017/0331749 A1    Nov. 16, 2017

Related U.S. Application Data

(63) Continuation of application No. PCT/CN2015/072065, filed on Jan. 31, 2015.

(51) Int. Cl.
*H04L 12/851* (2013.01)
*H04L 29/06* (2006.01)
(Continued)

(52) U.S. Cl.
CPC ........ *H04L 47/2425* (2013.01); *H04L 45/306* (2013.01); *H04L 45/38* (2013.01); *H04L 67/16* (2013.01); *H04L 69/22* (2013.01)

(58) Field of Classification Search
CPC ....... H04L 12/56; H04L 12/5689–5692; H04L 12/5695–5696; H04L 47/24–2491;
(Continued)

(56) References Cited

U.S. PATENT DOCUMENTS 8,284,664 B1 * 10/2012 Aybay ................... H04L 41/12
370/235
2005/0074000 A1    4/2005 Yokoyama et al.
(Continued)

FOREIGN PATENT DOCUMENTS

CN        101075968 A    11/2007
CN        101572670 A    11/2009
(Continued)

OTHER PUBLICATIONS

Miao, "Network Setup Advanced Routing and Switching Technology," pp. 1-5, Dongsoft Electronic Publishing House (Jul. 2013).

*Primary Examiner* — Eric Myers
(74) *Attorney, Agent, or Firm* — Leydig, Voit & Mayer, Ltd.

(57) ABSTRACT

Embodiments of the present disclosure provide a processing method for a service flow packet, and the method includes: receiving, by an access device, a service flow packet sent by a terminal; determining, by the access device according to a flow table and the received service flow packet, a function module for processing the service flow packet; sending, by the access device, the service flow packet to the function module; obtaining, by the access device, a service flow packet processed by the function module; and sending, by the access device, the service flow packet processed by the function module. The embodiments of the present disclosure further provide a device for processing a service flow packet. By using the present disclosure, processing flexibility and processing efficiency of a service flow packet can be improved.

8 Claims, 4 Drawing Sheets

(51) Int. Cl.
*H04L 12/725* (2013.01)
*H04L 12/721* (2013.01)
*H04L 29/08* (2006.01)

(58) Field of Classification Search
CPC ......... H04L 47/80–808; H04L 63/1408–1425; H04L 63/306
See application file for complete search history.

(56) References Cited

U.S. PATENT DOCUMENTS

| | | |
|---|---|---|
| 2013/0272305 A1 | 10/2013 | Lefebvre et al. |
| 2016/0065468 A1 | 3/2016 | Jiang et al. |
| 2018/0219785 A1 | 8/2018 | Huang et al. |

FOREIGN PATENT DOCUMENTS

| | | |
|---|---|---|
| CN | 102025643 A | 4/2011 |
| CN | 103051629 A | 4/2013 |
| CN | 104009918 A | 8/2014 |
| CN | 104247348 A | 12/2014 |
| EP | 1511229 A1 | 3/2005 |
| EP | 2765751 A1 | 7/2013 |
| EP | 2953302 A1 | 12/2015 |
| JP | 2002354009 A | 12/2002 |
| WO | 03/103233 A1 | 12/2003 |
| WO | 2013093860 A1 | 6/2013 |
| WO | 2014127701 A1 | 8/2014 |

\* cited by examiner

PROCESSING METHOD FOR SERVICE FLOW PACKET, AND DEVICE

CROSS-REFERENCE TO RELATED APPLICATION

This application is a continuation of International Application No. PCT/CN2015/072065, filed on Jan. 31, 2015, the disclosure of which is hereby incorporated by reference in its entirety.

TECHNICAL FIELD

The present disclosure relates to the field of communications technologies, and in particular, to a processing method for a service flow packet, and a device.

BACKGROUND

In future software-defined networking (SDN), different services or applications have greatly different requirements on network data transmission. In addition, due to popularization of a machine to machine (M2M) technology, there is a massive increase in data connections, and an amount of data transmitted in a network also explosively increases.

However, a packet processing requirement of an existing wireless device is that various types of packets are processed by using a fixed mechanism, and therefore, service adaptability is poor, and processing efficiency of a service flow packet is low. In addition, because the existing wireless device is based on special-purpose hardware, and costs of upgrading and deploying a new function are high, the existing wireless device has difficulty in implementing network flexibility and in dealing with various future services with a great difference.

SUMMARY

Embodiments of the present disclosure provide a processing method for a service flow packet and a device, so that an access device can determine, according to a flow table, a function module for processing a service flow packet, and forward the service flow packet to a corresponding function module for processing, to improve processing flexibility of the service flow packet and processing efficiency of the service flow packet.

A first aspect of the embodiments of the present disclosure provides a processing method for a service flow packet, which may include:

receiving, by an access device, a service flow packet sent by a terminal;

determining, by the access device according to a flow table and the received service flow packet, a function module for processing the service flow packet;

sending, by the access device, the service flow packet to the function module;

obtaining, by the access device, a service flow packet processed by the function module; and sending, by the access device, the service flow packet processed by the function module.

With reference to the first aspect, in a first possible implementation manner, the determining, by the access device according to a flow table and the received service flow packet, a function module for processing the service flow packet includes:

determining, by the access device according to the flow table and the received service flow packet, multiple function modules for processing the service flow packet; and determining, by the access device, a processing sequence of the multiple function modules according to the flow table and the received service flow packet.

With reference to the first possible implementation manner of the first aspect, in a second possible implementation manner, the sending, by the access device, the service flow packet to the function module includes:

sending, by the access device, the service flow packet to the multiple function modules according to the processing sequence.

With reference to the second possible implementation manner of the first aspect, in a third possible implementation manner, the sending, by the access device, the service flow packet to the multiple function modules according to the processing sequence includes:

adding, by the access device into the service flow packet, a route identifier of the first function module corresponding to the processing sequence, and sending the service flow packet to the first function module.

With reference to the third possible implementation manner of the first aspect, in a fourth possible implementation manner, after receiving a service flow packet processed by any function module, the access device adds, into the service flow packet processed by the any function module, a route identifier of a next function module indicated by the processing sequence, and sends the service flow packet to the function module corresponding to the route identifier.

With reference to the first possible implementation manner of the first aspect, in a fifth possible implementation manner of the first aspect, before the determining, by the access device according to a flow table and the received service flow packet, a function module for processing the service flow packet, the method further includes:

determining, by the access device according to a service requirement of the service flow packet, a type of the function module for processing the service flow packet;

setting, by the access device in the flow table, a correspondence between an identifier of the service flow packet and the type of the function module; and setting, by the access device in the flow table, a processing sequence of all types of function modules according to the service requirement of the service flow packet.

With reference to the fifth possible implementation manner of the first aspect, in a sixth possible implementation manner, the identifier of the service flow packet includes at least one of a destination IP address, a source IP address, a destination port, or a source port that is of the service flow packet, or a bearer identifier used by the terminal when sending the service flow packet to the access device, where the bearer identifier includes a physical channel identifier or a logical connection identifier.

With reference to the sixth possible implementation manner of the first aspect, in a seventh possible implementation manner, the determining, by the access device according to the flow table and the received service flow packet, multiple function modules for processing the service flow packet includes:

querying, by the access device, the flow table according to the identifier of the received service flow packet, and determining types of the multiple function modules for processing the service flow packet;

searching, by the access device, multiple function modules built in the access device for all function modules corresponding to the types of the multiple function modules for processing the service flow packet, and determining statuses of all the function modules; and determining, according to the statuses of all the function modules, each type of function module specifically for processing the service flow packet.

With reference to the third possible implementation manner of the first aspect, in an eighth possible implementation manner, the sending, by the access device, the service flow packet to the multiple function modules according to the processing sequence includes:

adding, by the access device, a route identifier of each of the function modules into the service flow packet; and sending the service flow packet to the first function module corresponding to the processing sequence, and sending a service flow packet processed by the first function module to a next function module by using the first function module and according to a route identifier corresponding to the next function module indicated by the processing sequence, to further send a service flow packet processed by the next function module to a next function module by using the next function module and according to the processing sequence and the route identifier.

A second aspect of the embodiments of the present disclosure provides a processing device for a service flow packet, which may include:

a receiving module, configured to receive a service flow packet sent by a terminal;

a query module, configured to determine, according to a flow table and the service flow packet received by the receiving module, a function module for processing the service flow packet; and a sending module, configured to send the service flow packet to the function module determined by the query module, where the receiving module is further configured to obtain a service flow packet processed by the function module; and the sending module is further configured to send the service flow packet processed by the function module.

With reference to the second aspect, in a first possible implementation manner, the query module includes:

a first processing unit, configured to determine, according to the flow table and the service flow packet received by the receiving module, multiple function modules for processing the service flow packet; and a second processing unit, configured to determine a processing sequence of the multiple function modules according to the flow table and the service flow packet received by the receiving module.

With reference to the first possible implementation manner of the second aspect, in a second possible implementation manner, the sending module is specifically configured to:

send, according to the processing sequence determined by the second processing unit of the query module, the service flow packet to the multiple function modules determined by the first processing unit of the query module.

With reference to the second possible implementation manner of the second aspect, in a third possible implementation manner, the sending module is specifically configured to:

add, into the service flow packet, a route identifier of the first function module corresponding to the processing sequence, and send the service flow packet to the first function module.

With reference to the third possible implementation manner of the second aspect, in a fourth possible implementation manner, the sending module is further configured to:

after the receiving module receives service flow packet processed by any function module, add, into a service flow packet processed by the any function module, a route identifier of a next function module indicated by the processing sequence, and send the service flow packet to the function module corresponding to the route identifier.

With reference to the first possible implementation manner of the second aspect, in a fifth possible implementation manner, the processing device further includes:

a setting module, configured to: determine, according to a service requirement of the service flow packet received by the receiving module, a type of the function module for processing the service flow packet, and set, in the flow table, a correspondence between an identifier of the service flow packet and the type of the function module, where the setting module is further configured to set, in the flow table, a processing sequence of all types of function modules according to the service requirement of the service flow packet received by the receiving module.

With reference to the fifth possible implementation manner of the second aspect, in a sixth possible implementation manner, the identifier of the service flow packet includes at least one of a destination IP address, a source IP address, a destination port, or a source port that is of the service flow packet, or a bearer identifier used by the terminal when sending the service flow packet to the access device, where the bearer identifier includes a physical channel identifier or a logical connection identifier.

With reference to the sixth possible implementation manner of the second aspect, in a seventh possible implementation manner, the first processing unit is specifically configured to:

query the flow table according to the identifier of the service flow packet received by the receiving module, and determine types of the multiple function modules for processing the service flow packet;

search multiple function modules built in the processing device for all function modules corresponding to the types of the multiple function modules for processing the service flow packet, and determine statuses of all the function modules; and determine, according to the statuses of all the function modules, each type of function module specifically for processing the service flow packet.

With reference to the third possible implementation manner of the second aspect, in an eighth possible implementation manner, the sending module is further configured to:

add a route identifier of each of the function modules into the service flow packet; and send the service flow packet to the first function module corresponding to the processing sequence, and send a service flow packet processed by the first function module to a next function module by using the first function module and according to a route identifier corresponding to the next function module indicated by the processing sequence, to further send a service flow packet processed by the next function module to a next function module by using the next function module and according to the processing sequence and the route identifier.

A third aspect of the embodiments of the present disclosure provides an access device, which may include:

a memory, a receiver, a transmitter, and a processor, where the receiver, the transmitter, and the processor are separately connected to the memory, and the processor is separately connected to the receiver and the transmitter;

the memory stores a set of program code; and the receiver, the transmitter, and the processor are configured to invoke the program code stored in the memory, to perform the following operations:

the receiver is configured to receive a service flow packet sent by a terminal;

the processor is configured to determine, according to a flow table and the service flow packet received by the receiver, a function module for processing the service flow packet;

the transmitter is configured to send the service flow packet to the function module determined by the processor;

the receiver is further configured to obtain a service flow packet processed by the function module determined by the processor; and the transmitter is further configured to send the service flow packet processed by the function module.

With reference to the third aspect, in a first possible implementation manner, the processor is specifically configured to:

determine, according to the flow table and the service flow packet received by the receiver, multiple function modules for processing the service flow packet; and determine a processing sequence of the multiple function modules according to the flow table and the received service flow packet.

With reference to the first possible implementation manner of the third aspect, in a second possible implementation manner, the transmitter is specifically configured to:

send the service flow packet to the multiple function modules according to the processing sequence determined by the processor.

With reference to the second possible implementation manner of the third aspect, in a third possible implementation manner, the transmitter is specifically configured to:

add, into the service flow packet, a route identifier of the first function module corresponding to the processing sequence determined by the processor, and send the service flow packet to the first function module.

With reference to the third possible implementation manner of the third aspect, in a fourth possible implementation manner, the transmitter is further configured to:

after the receiver receives a service flow packet processed by any function module, add, into the service flow packet processed by the any function module, a route identifier of a next function module indicated by the processing sequence, and send the service flow packet to the function module corresponding to the route identifier.

With reference to the first possible implementation manner of the third aspect, in a fifth possible implementation manner, the processor is further configured to:

determine, according to a service requirement of the service flow packet received by the receiver, a type of the function module for processing the service flow packet;

set, in the flow table, a correspondence between an identifier of the service flow packet and the type of the function module; and set, in the flow table, a processing sequence of all types of the function modules according to the service requirement of the service flow packet.

With reference to the fifth possible implementation manner of the third aspect, in a sixth possible implementation manner, the identifier of the service flow packet includes at least one of a destination IP address, a source IP address, a destination port, or a source port that is of the service flow packet, or a bearer identifier used by the terminal when sending the service flow packet to the access device, where the bearer identifier includes a physical channel identifier or a logical connection identifier.

With reference to the sixth possible implementation manner of the third aspect, in a seventh possible implementation manner, the processor is specifically configured to:

query the flow table according to the identifier of the service flow packet received by the receiver, and determine types of the multiple function modules for processing the service flow packet;

search multiple function modules built in the access device for all function modules corresponding to the types of the multiple function modules for processing the service flow packet, and determine statuses of all the function modules; and determine, according to the statuses of all the function modules, each type of function module specifically for processing the service flow packet.

With reference to the third possible implementation manner of the third aspect, in an eighth possible implementation manner, the transmitter is further configured to:

add a route identifier of each of the function modules determined by the processor into the service flow packet; and send the service flow packet to the first function module corresponding to the processing sequence, and send a service flow packet processed by the first function module to a next function module by using the first function module and according to a route identifier corresponding to the next function module indicated by the processing sequence, to further send a service flow packet processed by the next function module to a next function module by using the next function module and according to the processing sequence and the route identifier.

In the embodiments of the present disclosure, an access device may query a flow table according to a service flow packet sent by a terminal; determine a function module for processing the service flow packet, to further send the service flow packet to each function module; and finally, forward, from the access device, an obtained service flow packet processed by each function module. In the embodiments of the present disclosure, a service flow packet may be sent, according to a flow table, to a corresponding function module for processing, thereby improving processing flexibility of the service flow packet and processing efficiency of the service flow packet.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

In a future SDN network, different services or applications have greatly different requirements on network transmission. In addition, with popularization of an M2M technology, there is also a massive increase in data connections. Therefore, the embodiments of the present disclosure provide a new access device that is used to deal with service flow packet (or a data stream) processing in the future SDN network.

In specific implementation, the new access device provided in the embodiments of the present disclosure may be a virtual device of a virtual function module having a specified function, or may be a hardware device of a hardware function module having a specified function. With reference to FIG. 1 to FIG. 5, the following uses the virtual device as an example, to describe in detail a processing method for a service flow packet and a device that are provided in the embodiments of the present disclosure. A function module described in the embodiments of the present disclosure may include a module having a header compression function, or a security function, or a Packet Data Convergence Protocol (PDCP) function, or a Radio Link Control (RLC) function, or a Media Access Control (MAC) function. Further, the function module described in the embodiments of the present disclosure may further include a module having a video service acceleration function, or a data content buffering function, or a Transmission Control Protocol (TCP) acceleration function, or the like. The foregoing function module is only an example but is not exhaustive, and includes but is not limited to the foregoing function modules.

Figure 1:
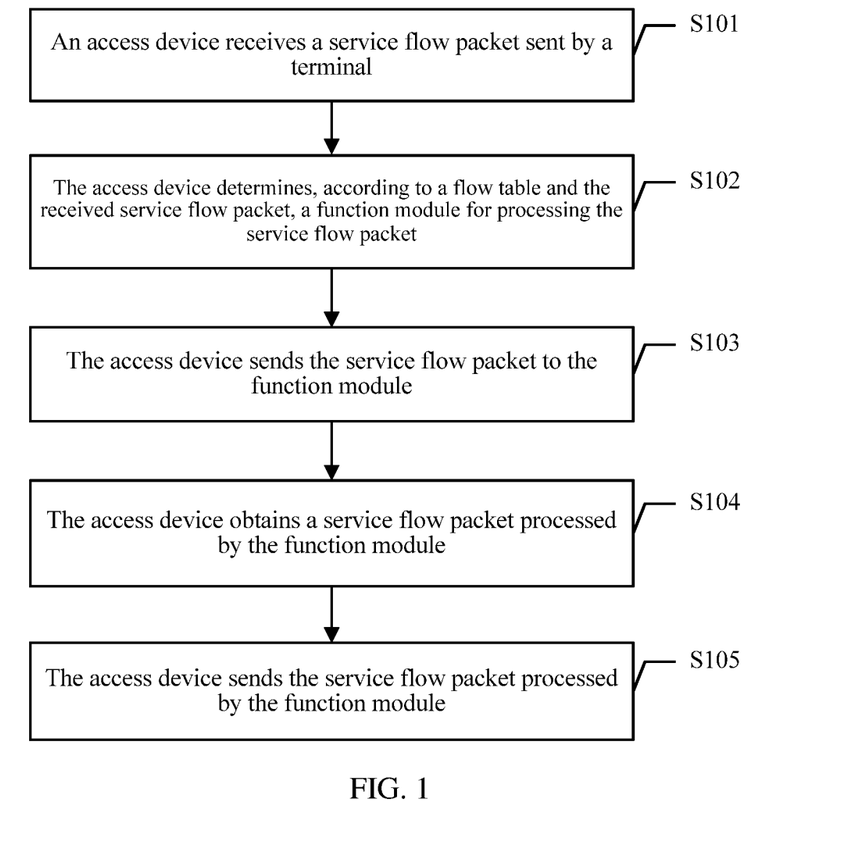
FIG. 1 is a schematic flowchart of a first embodiment of a processing method for a service flow packet according to an embodiment of the present disclosure.

Referring to FIG. 1, FIG. 1 is a schematic flowchart of a first embodiment of a processing method for a service flow packet according to an embodiment of the present disclosure. The processing method for a service flow packet described in this embodiment of the present disclosure includes the following steps:

S101. An access device receives a service flow packet sent by a terminal.

S102. The access device determines, according to a flow table and the received service flow packet, a function module for processing the service flow packet.

S103. The access device sends the service flow packet to the function module.

S104. The access device obtains a service flow packet processed by the function module.

S105. The access device sends the service flow packet processed by the function module.

In some feasible implementation manners, the access device may receive a service flow packet sent by each terminal in a network, and the foregoing terminal may include a device such as a mobile phone, a computer, or a personal computer assistant, or may be a base station. The foregoing terminal or base station is only an example but is not exhaustive, includes but is not limited to the foregoing terminals, and is not limited herein.

In some feasible implementation manners, after receiving the service flow packet sent by the terminal, the access device may query, according to the foregoing packet, a flow table preset in the access device, and determine a processing policy for the foregoing received packet according to configuration information in the foregoing flow table. The foregoing flow table includes: an identifier of a packet, a type that is of each function module for processing the foregoing packet and is corresponding to the identifier of the packet, and a processing sequence of all types of function modules. In specific implementation, because each function module has a limited processing capability, multiple types of function modules may be preconfigured in the access device, to enable the access device to more efficiently process each service flow packet. Each type may be corresponding to multiple function modules, that is, there may be multiple function modules corresponding to each type, and function modules of a same type have a same function.

In some feasible implementation manners, after receiving the foregoing service flow packet, the access device may query the foregoing flow table according to an identifier of the foregoing service flow packet, and obtain, from the foregoing flow table, a type that is of a function module and is corresponding to the identifier of the foregoing service flow packet, to further find, from all function modules built in the access device, all function modules corresponding to the foregoing type, and determine the function module for processing the foregoing packet. For example, multiple function modules may be built in the access device, and the foregoing multiple function modules may include function modules having different function types, for example, a first function module having a first function, or a second function module having a second function, or a third function module having a third function. The foregoing first function module is corresponding to, for example, a function module of a type in which air-interface header compression processing is successively performed on downlink packets; the second function module is corresponding to, for example, a function module of another type in which air-interface PDCP processing is successively performed on downlink packets; the third function module is corresponding to, for example, a function module of another type in which air-interface RLC processing is successively performed on downlink packets, and the like. That is, the foregoing flow table may include at least three types of function modules. In specific implementation, different types of function modules may use different names or IDs as type identifiers, and the foregoing type identifier may be used to distinguish a type of each function module. Specifically, each type of function module may include at least one module. For example, the foregoing first function module may include one or more modules; the second function module may also include one or more modules; the third function module may also include one or more modules.

In some feasible implementation manners, after determining the type of the foregoing function module, the access device may obtain, from all the function modules built in the access device, all the function modules corresponding to the type of the foregoing function module, to further determine, according to statuses of all the function modules, a function module that is currently in each type of function module and is specifically for processing the foregoing packet (a target function module). The status of the foregoing function module may include a load status of a function module, transmission overheads between function modules, or the like. The status of the foregoing function module is only an example but is not exhaustive, includes but is not limited to the foregoing statuses, may be specifically determined according to a specific application scenario of the access device, and is not limited herein. For example, the access device may determine, according to the identifier of the foregoing service flow packet, that the function module for processing the foregoing packet is the first function module (that is, a function module having the first function, and the access device may obtain, from the function modules built in the access device, a first function module 1, a first function module 2, a first function module 3, and the like that have the first function. After obtaining the foregoing first function module 1, first function module 2, and first function module 3, according to statuses of all the foregoing function modules and according to a requirement such as load balancing or transmission overheads between function modules, the access device may select, from the foregoing first function module 1, first function module 2, and first function module 3, the first function module 1 as the target function module for processing the foregoing packet.

In specific implementation, when multiple types of function modules are required for the foregoing packet, the access device may query the foregoing flow table according to an identifier of the foregoing service flow packet, and obtain, from the flow table, multiple function modules that are of multiple types and are for processing the foregoing packet, for example, a first function module 1, a second function module 2, and a third function module 3; and may further obtain a processing sequence of all the foregoing function modules by querying the foregoing flow table. That is, the access device may obtain, by querying the foregoing flow table, the first function module 1, the second function module 2, and the third function module 3 that are for processing the foregoing packet, and may further obtain, by querying the foregoing flow table, a processing sequence in which the foregoing first function module 1, second function module 2, and third function module 3 process the foregoing packet. For example, the first function module 1 is prior to the second function module 2, and the second function module 2 is prior to the third function module 3.

In some feasible implementation manners, after determining, according to the identifier of the foregoing service flow packet, the target function module for processing the foregoing packet, for example, the first function module 1, the second function module 2, and/or the third function module 3, the access device may send the foregoing received packet to the foregoing target function module, to process the foregoing packet by using the foregoing target function module.

Further, after sending the foregoing packet to the target function module for processing, the access device may obtain a packet processed by the foregoing target function module, to further send the foregoing packet to a target node. Specifically, after processing of downlink data is completed, the access device may send the downlink data to the terminal by using an air interface. For uplink data, the packet received by the access device may be specifically an IP packet, and after the foregoing IP packet is processed, the access device may send, by using an IP network, a processed IP packet to a target node to which a destination address of the IP packet points.

In this embodiment of the present disclosure, an access device may query a flow table according to a service flow packet sent by a terminal; determine a function module for processing the packet, to further send the foregoing packet to each function module; and obtain a packet processed by each function module, to further send the foregoing packet. In this embodiment of the present disclosure, a service flow packet may be forwarded, according to a status of each function module in a flow table, to a specified function module for processing, thereby improving processing flexibility of the service flow packet and processing efficiency of the service flow packet.

Figure 2A:
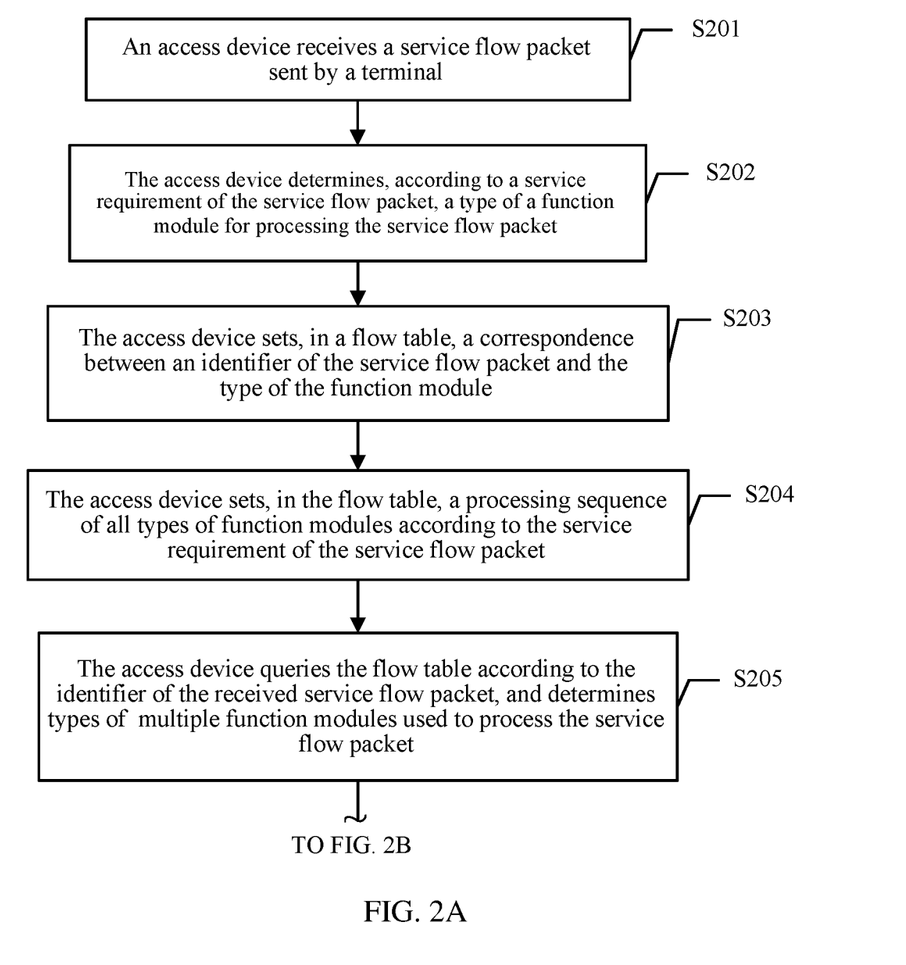
FIG. 2A and FIG. 2B are a schematic flowchart of a second embodiment of a processing method for a service flow packet according to an embodiment of the present disclosure.
Figure 2B:
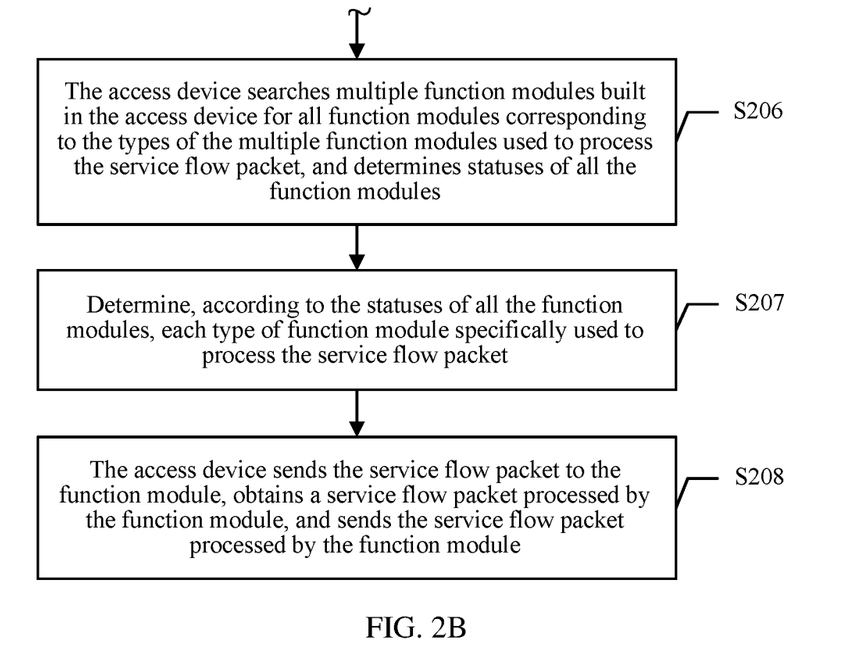

Referring to FIG. 2A and FIG. 2B, FIG. 2A and FIG. 2B are a schematic flowchart of a second embodiment of a processing method for a service flow packet according to an embodiment of the present disclosure. The processing method for a service flow packet described in this embodiment of the present disclosure includes the following steps:

S201. An access device receives a service flow packet sent by a terminal.

S202. The access device determines, according to a service requirement of the service flow packet, a type of a function module for processing the service flow packet.

S203. The access device sets, in a flow table, a correspondence between an identifier of the service flow packet and the type of the function module.

S204. The access device sets, in the flow table, a processing sequence of all types of function modules according to the service requirement of the service flow packet.

S205. The access device queries the flow table according to the identifier of the received service flow packet, and determines types of multiple function modules for processing the service flow packet.

S206. The access device searches multiple function modules built in the access device for all function modules corresponding to the types of the multiple function modules for processing the service flow packet, and determines statuses of all the function modules.

S207. Determine, according to the statuses of all the function modules, each type of function module specifically for processing the service flow packet.

S208. The access device sends the service flow packet to the function module, obtains a service flow packet processed by the function module, and sends the service flow packet processed by the function module.

In specific implementation, the access device may receive a service flow packet sent by each terminal. For a specific implementation process, refer to the foregoing embodiment. Details are not described herein again.

In some feasible implementation manners, the access device described in this embodiment of the present disclosure may further preconfigure the flow table according to the service requirement of the received service flow packet, to further determine, according to the foregoing flow table and statuses of all function modules in the access device, a specific function module for processing the foregoing packet, and implement load balancing control and the like. For example, the access device may determine a processing requirement of the foregoing service flow packet and/or a processing procedure of the service flow packet according to the received service flow packet. For example, if the received service flow packet is a packet of a downlink video service, a processing requirement of the foregoing downlink video service may include processing of a video service acceleration function in a network, and processing of functions such as air-interface header compression, security, PDCP, RLC, and MAC. Further, the access device may parse the foregoing packet according to the received packet, and determine a processing procedure of the foregoing packet of the downlink video service. The foregoing processing procedure may include a sequence for processing the foregoing various functions. The access device may determine a processing sequence of all function modules according to the sequence that is for processing the functions and is carried in the processing procedure.

In some feasible implementation manners, the access device may configure the foregoing flow table according to the service requirement of the received service flow packet. The processing requirement of the foregoing service flow packet includes a requirement for the function module for processing the foregoing packet, and the requirement includes a quantity of function modules for processing the foregoing packet and/or a type of each function module. Specifically, the access device may determine, according to the foregoing processing requirement, a type of a function module for processing the foregoing packet, and then determine, according to statuses of all function modules built in the access device, a function module that performs a processing operation on the packet, where the function module is in all function modules corresponding to the type of the function module limited in the foregoing processing requirement. Further, a correspondence between the identifier of the foregoing packet and a type of a function module specifically for processing the packet may be established in the foregoing flow table. For example, if the processing requirement of the foregoing service flow packet specifies three function modules of three types to process the foregoing packet: a first function module having a first function, a second function module having a second function, and a third function module having a third function, the access device may set, in the flow table, the type of the function module for processing the foregoing packet as the following three types: the first function module, the second function module, and the third function module, and establish a correspondence between the identifier of the packet and a type of each function module. For example, if the packet received by the access device is a packet A, the processing requirement of the foregoing processing policy limits a function module for processing the foregoing packet A to the first function module having the first function, the second function module having the second function, and the third function module having the third function. The access device may set, in the foregoing flow table, a type of the function module for processing the packet A as the following three types: the first function module, the second function module, and the third function module, and establish a correspondence between the packet A and each of the first function module, the second function module, and the third function module.

In this embodiment of the present disclosure, the identifier of the foregoing packet includes: a destination IP address, a source IP address, a destination port, or a source port that is of the packet, or a bearer identifier used by the terminal such as a mobile phone or a computer when sending the packet to the access device, or the like. The foregoing bearer identifier includes a physical channel identifier or a logical connection identifier. In this embodiment of the present disclosure, a wireless interface or a wired interface may be further disposed in the access device and is used for user-oriented access or forwarding. The foregoing wireless interface may be specifically a Long Term Evolution (LTE) interface, and the foregoing wired interface may be specifically an Ethernet interface. The terminal may establish a connection to the access device by using the foregoing wireless interface or wired interface, and the access device may determine the destination port or the source port of the packet by using the foregoing connection, or obtain, in a process of interacting with the terminal, the destination IP address or the source IP address of the packet, or the bearer identifier used by the terminal when sending the packet, or the like. The identifier of the foregoing packet is only an example but is not exhaustive, and includes but is not limited to the foregoing identifiers. A manner of obtaining the identifier of the foregoing packet is only an example, may be specifically determined according to a manner in which the access device communicates with the terminal, and is not limited herein.

In some feasible implementation manners, after configuring the following three types in the flow table: a first function module 1, a second function module 2, and a third function module 3 that are for processing the foregoing packet, the access device may further configure, in the flow table, a processing sequence of all the function modules according to the processing procedure of the foregoing service flow packet. For example, the first function module 1 is prior to the second function module 2, and the second function module 2 is prior to the third function module 3. This is shown in the following Table 1:

TABLE 1

| Packet | Type of a function module | Processing sequence of function modules |
|---|---|---|
| Packet A | First function module, second function module, and third function module | First function module → second function module → third function module |
| Packet B | First function module, second function module, and fourth function module | First function module → second function module → fourth function module |

The packet, the types of the function modules corresponding to the packet, and the processing sequence of all the function modules that are listed in the foregoing Table 1 are only examples, and the modules are not fixed or the sequence is not fixed. Specifically, types of function modules corresponding to a packet and a processing sequence of all the function modules may be determined according to an actual requirement, and are not limited herein.

In some feasible implementation manners, after determining the type (for example, the first function module, the second function module, and the third function module) of the function module for processing the packet, the access device may search all the function modules built in the access device for the first function module, the second function module, and the third function module. The foregoing first function module may include multiple function modules having the first function; the second function module may also include multiple function modules having the second function; the third function module may also include multiple function modules having the third function. After obtaining, from all the built-in function modules, all function modules corresponding to the type of the function module for processing the received packet, the access device may further determine load statuses of all the function modules, transmission overhead statuses between all the function modules, or the like according to working statuses of all the function modules.

In some feasible implementation manners, after obtaining all function modules of all types, the access device may determine, according to statuses of all the function modules, a function module specifically for processing the foregoing packet (a target function module for short). For example, after obtaining all modules in the foregoing first function module by means of query, the access device may select, according to statuses of all the function modules, a function module from all the function modules as a first target function module (for example, the first function module 1) for processing the packet. Likewise, the access device may select, from the second function module, a function module as a second target function module (for example, the second function module 2) for processing the packet, select, from the third function module, a function module as a third target function module (for example, the third function module 3) for processing the packet, and the like.

In some feasible implementation manners, after determining the target function module for processing the packet received by the access device, the access device may add a route identifier of each target function module into the foregoing packet. Specifically, the access device may add, into the packet, a route identifier of the first function module corresponding to the foregoing processing sequence, and send the foregoing packet to the first function module according to the foregoing route identifier. Further, after sending the foregoing packet, when receiving a packet processed by any function module (for example, the first function module), the access device adds, into the packet processed by the foregoing any function module, a route identifier of a next function module indicated by the foregoing processing sequence, and sends the packet to the function module corresponding to the foregoing route identifier. For example, after determining that the target function module for processing the packet A includes the first target function module (first function module 1), the second target function module (the second function module 2), and the third target function module (the third function module 3), the access device may add a route identifier of the foregoing first function module 1 into a header of the foregoing packet A. After receiving a packet processed by the foregoing first function module 1, the access device may add a route identifier of the foregoing second function module 2 into the packet processed by the first function module 1, and then send the foregoing packet to the second function module 2, to further add a route identifier of the third function module 3 into a packet processed by the second function module 2, and send the packet to the third function module 3.

In specific implementation, the route identifier of each target function module may be specifically a data processing path in which each target function module processes the foregoing packet. Specifically, after adding the route identifier of each target function module into the packet, the access device may separately forward the foregoing packet to each target function module according to the foregoing determined processing sequence of all the function modules, to process the foregoing packet by using each target function module, and finally, forward, from the access device, a packet processed by each target function module. For example, when forwarding the packet that includes the route identifier of each target function module to each module for processing, the access device may further forward, according to the processing sequence configured in the foregoing flow table, the packet to the first function module 1 for processing. A header processing module of the first function module 1 may peel off the route identifier included in the packet, and submit the packet to a processing module for processing. After processing the packet, the processing module may return the packet to the header processing module, and the header processing module may add route identifiers of the second function module 2 and the third function module 3 into the header of the packet, and return a packet to the access device. The access device may forward, according to the route identifiers in the packet, the packet to the second function module 2 for processing, and then forward, according to a route identifier, the packet processed by the second function module 2 to the third function module 3 for processing. In this embodiment of the present disclosure, the access device may forward a packet to each function module, and each function module performs data processing on the packet. Each function module needs to communicate only with the access device, and there is no need to implement interaction and communication between all the function modules, so that a communication requirement is relatively low and adaptability is stronger.

Further, in some feasible implementation manners, the access device may further add, into the header of the packet, the route identifier of each target function module for processing the packet, and forward, according to the processing sequence configured in the flow table, the packet to the first target function module corresponding to the processing sequence. Further, the access device sends a packet processed by the first target function module to a next function module by using the foregoing first target function module and according to a route identifier corresponding to the next function module indicated by the foregoing processing sequence, to further send a packet processed by the next function module to a next function module by using the next function module and according to the foregoing processing sequence and the route identifier. For example, if a processing sequence of the foregoing first function module 1, second function module 2, and third function module 3 is that the first function module 1 is prior to the second function module 2, and the second function module 2 is prior to the third function module 3, the access device may first forward the packet to the first function module 1 for processing. Further, the access device forwards, by using the first function module 1 and according to a route identifier of the second function module 2, the packet processed by the first function module 1 to the second function module 2 for processing; next, forwards, by using the second function module 2 and according to a route identifier of the third function module 3, a packet processed by the second function module 2 to the third function module 3 for processing; and finally, forwards, from the access device, the packet processed by the third function module 3. In this embodiment of the present disclosure, the access device forwards the packet to the first function module 1 by using a forwarding module; then forwards the packet to the second function module 2 by using the first function module 1; and forwards the packet to the third function module 3 by using the second function module 2. The packet is forwarded between all the modules, so that processing efficiency is high. However, all the function modules need to be capable of directly interacting with each other, and there is also a relatively high communication requirement.

In some feasible implementation manners, after forwarding the packet to each function module for processing, the access device may forward, from the access device, the packet processed by each function module. In specific implementation, for a specific implementation process in which the access device forwards the packet processed by each function module, refer to the foregoing embodiment. Details are not described herein again.

In this embodiment of the present disclosure, an access device may configure, according to a service requirement of a received service flow packet, a flow table preset in the access device, and after receiving a service flow packet sent by a terminal, the access device may query the preset flow table according to the foregoing packet; determine a function module for processing the packet and a processing sequence of all function modules, to further add a route identifier of each of the function modules into the packet; forward, according to the foregoing processing sequence and the route identifier, the packet to each of the function modules for processing; and finally, forward, from the access device, a packet processed by each of the function modules. In this embodiment of the present disclosure, a flow table for packet processing may be configured in real time according to a service requirement, and a service flow packet is forwarded, according to the flow table, to a specified function module for processing, thereby improving processing flexibility of the service flow packet and processing efficiency of the service flow packet.

Figure 3:
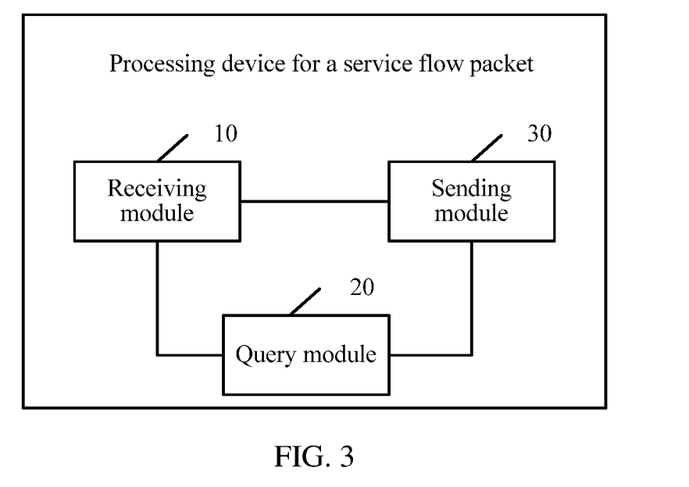
FIG. 3 is a schematic structural diagram of a first embodiment of a processing device for a service flow packet according to an embodiment of the present disclosure.

Referring to FIG. 3, FIG. 3 is a schematic structural diagram of a first embodiment of a processing device for a service flow packet according to an embodiment of the present disclosure. The processing device for a service flow packet provided in this embodiment of the present disclosure includes:

a receiving module 10, configured to receive a service flow packet sent by a terminal;

a query module 20, configured to determine, according to a flow table and the service flow packet received by the receiving module, a function module for processing the service flow packet; and a sending module 30, configured to send the service flow packet to the function module determined by the query module, where the foregoing receiving module 10 is further configured to obtain a service flow packet processed by the function module; and the foregoing sending module 30 is further configured to send the service flow packet processed by the function module.

In specific implementation, the processing device for a service flow packet described in this embodiment of the present disclosure may be specifically an access device described in the embodiments of the present disclosure. The processing device described in this embodiment of the present disclosure may perform, by using all the modules (which include the receiving module 10, the query module 20, and the sending module 30) of the processing device, an implementation manner described in a processing method for a service flow packet provided in the embodiments of the present disclosure. For specific implementation manners of all the foregoing modules, refer to steps S101 to S105 in a first embodiment of the processing method for a service flow packet provided in the embodiments of the present disclosure. Details are not described herein again.

In this embodiment of the present disclosure, an access device may query a flow table according to a service flow packet sent by a terminal; determine a function module for processing the packet, to further send the foregoing packet to each function module; and obtain a packet processed by each function module, to further send the foregoing packet. In this embodiment of the present disclosure, a packet may be forwarded, according to a status of each function module in a flow table, to a specified function module for processing, thereby improving processing flexibility of the service flow packet and processing efficiency of the service flow packet.

Figure 4:
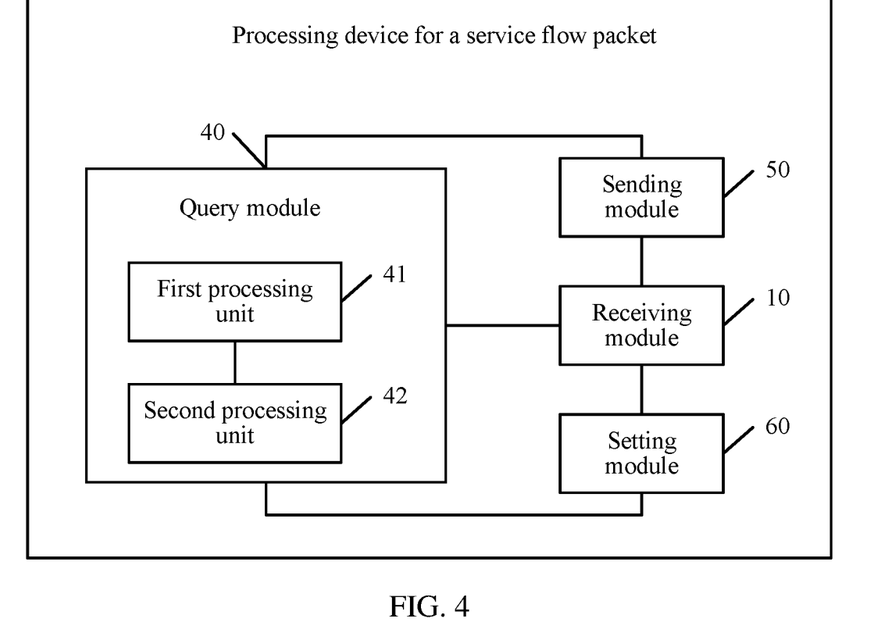
FIG. 4 is a schematic structural diagram of a second embodiment of a processing device for a service flow packet according to an embodiment of the present disclosure.

Referring to FIG. 4, FIG. 4 is a schematic structural diagram of a second embodiment of a processing device for a service flow packet according to an embodiment of the present disclosure. The processing device for a service flow packet provided in this embodiment of the present disclosure includes a receiving module 10, a query module 40, and a sending module 50.

The receiving module 10 is configured to receive a service flow packet sent by a terminal.

The query module 40 is configured to determine, according to a flow table and the service flow packet received by the receiving module, a function module for processing the service flow packet.

In some feasible implementation manners, the query module 40 described in this embodiment of the present disclosure may perform an implementation manner of the query module 20 described in a first embodiment of the foregoing processing device for a service flow packet. Further, the query module 40 described in this embodiment of the present disclosure may include a first processing unit 41 and a second processing unit 42, to perform the following operations:

the first processing unit 41 is configured to determine, according to the flow table and the service flow packet received by the receiving module, multiple function modules for processing the service flow packet; and the second processing unit 42 is configured to determine a processing sequence of the multiple function modules according to the flow table and the service flow packet received by the receiving module.

The sending module 50 is configured to send the service flow packet to the function module determined by the query module.

The foregoing receiving module 10 is further configured to obtain a service flow packet processed by the function module.

The foregoing sending module 50 is further configured to send the service flow packet processed by the function module.

In some feasible implementation manners, the sending module 50 described in this embodiment of the present disclosure may perform an implementation manner performed by the sending module 30 described in the first embodiment of the foregoing processing device for a service flow packet, and may be further specifically configured to:

send, according to the processing sequence determined by the second processing unit of the query module, the service flow packet to the multiple function modules determined by the first processing unit of the query module.

In some feasible implementation manners, the foregoing sending module 50 may be further specifically configured to:

add, into the service flow packet, a route identifier of the first function module corresponding to the processing sequence, and send the service flow packet to the first function module.

In some feasible implementation manners, the foregoing sending module 50 may be further configured to:

after the receiving module receives service flow packet processed by any function module, add, into a service flow packet processed by the any function module, a route identifier of a next function module indicated by the processing sequence, and send the service flow packet to the function module corresponding to the route identifier.

In some feasible implementation manners, the processing device for a service flow packet described in this embodiment of the present disclosure further includes:

a setting module 60, configured to: determine, according to a service requirement of the service flow packet received by the receiving module, a type of the function module for processing the service flow packet, and set, in the flow table, a correspondence between an identifier of the service flow packet and the type of the function module.

The setting module 60 is further configured to set, in the flow table, a processing sequence of all types of function modules according to the service requirement of the service flow packet received by the receiving module.

In some feasible implementation manners, the identifier of the service flow packet described in this embodiment of the present disclosure includes at least one of a destination IP address, a source IP address, a destination port, or a source port that is of the service flow packet, or a bearer identifier used by the terminal when sending the service flow packet to the access device, where the bearer identifier includes a physical channel identifier or a logical connection identifier.

In some feasible implementation manners, the first processing unit 41 of the query module 40 described in this embodiment of the present disclosure may be specifically configured to:

query the flow table according to the identifier of the service flow packet received by the receiving module, and determine types of the multiple function modules for processing the service flow packet;

search multiple function modules built in the processing device for all function modules corresponding to the types of the multiple function modules for processing the service flow packet, and determine statuses of all the function modules; and determine, according to the statuses of all the function modules, each type of function module specifically for processing the service flow packet.

In some feasible implementation manners, the sending module 50 described in this embodiment of the present disclosure is further configured to:

add a route identifier of each of the function modules into the service flow packet; and send the service flow packet to the first function module corresponding to the processing sequence, and send a service flow packet processed by the first function module to a next function module by using the first function module and according to a route identifier corresponding to the next function module indicated by the processing sequence, to further send a service flow packet processed by the next function module to a next function module by using the next function module and according to the processing sequence and the route identifier.

In specific implementation, the processing device for a service flow packet described in this embodiment of the present disclosure may be specifically an access device described in the embodiments of the present disclosure. The access device described in the embodiments of the present disclosure may further include various function modules having different functions or a same function, for example, the first function module, the second function module, or the third function module described in the foregoing embodiment. In specific implementation, the processing device described in this embodiment of the present disclosure may perform, by using all the modules (which include the receiving module 10, the query module 40, the sending module 50, the setting module 60, and the like) of the processing device, an implementation manner described in the processing method for a service flow packet provided in the embodiments of the present disclosure. For specific implementation manners of all the foregoing modules, refer to steps S101 to S105 in the first embodiment and steps S201 to S208 in the second embodiment of the processing method for a service flow packet provided in the embodiments of the present disclosure. Details are not described herein again.

In this embodiment of the present disclosure, an access device may configure, according to a service requirement of a received service flow packet, a flow table embedded in the access device, and after receiving a service flow packet sent by a terminal, the access device may query the preset flow table according to the foregoing packet; determine a function module for processing the packet and a processing sequence of all function modules, to further add a route identifier of each of the function modules into the packet; forward, according to the foregoing processing sequence and the route identifier, the packet to each of the function modules for processing; and finally, forward, from the access device, a packet processed by each of the function modules. In this embodiment of the present disclosure, a flow table for packet processing may be configured in real time according to a service requirement, and a service flow packet is forwarded, according to the flow table, to a specified function module for processing, thereby improving processing flexibility of the service flow packet and processing efficiency of the service flow packet.

Figure 5:
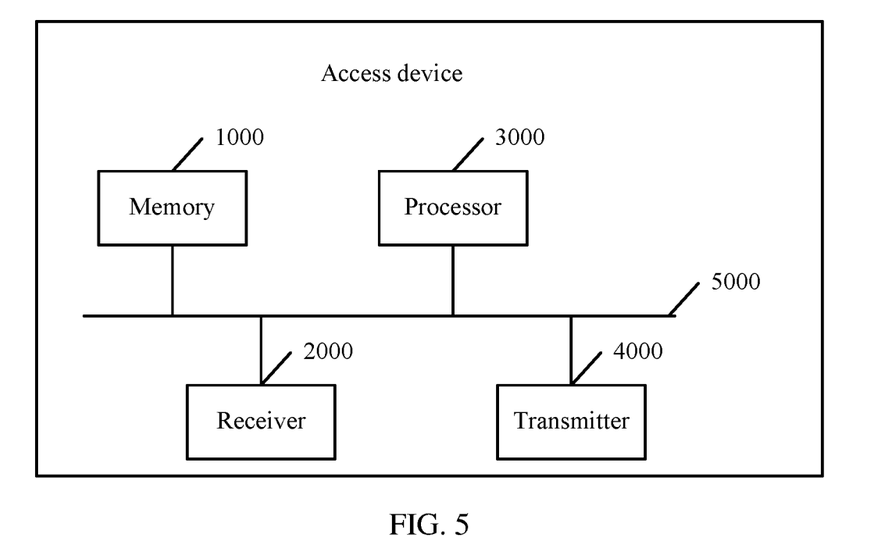
FIG. 5 is a schematic structural diagram of an embodiment of an access device according to an embodiment of the present disclosure.

Referring to FIG. 5, FIG. 5 is a schematic structural diagram of an embodiment of an access device according to an embodiment of the present disclosure. The access device provided in this embodiment of the present disclosure includes: a memory 1000, a receiver 2000, a processor 3000, and a transmitter 4000. The foregoing memory 1000, receiver 2000, processor 3000, and transmitter 4000 are separately connected by using a bus 5000. That is, the foregoing receiver 2000, transmitter 4000, and processor 3000 may be separately connected to the memory 1000 by using the bus 5000. The foregoing processor 3000 may be separately connected to the receiver 2000 and the transmitter 4000 by using the bus 5000.

The foregoing memory 1000 stores a set of program code.

The foregoing receiver 2000, transmitter 4000, and processor 3000 are configured to invoke the program code stored in the memory 1000, to perform the following operations:

the receiver 2000 is configured to receive a service flow packet sent by a terminal;

the processor 3000 is configured to determine, according to a flow table and the service flow packet received by the receiver, a function module for processing the service flow packet;

the transmitter 4000 is configured to send the service flow packet to the function module determined by the processor;

the receiver 2000 is further configured to obtain a service flow packet processed by the function module determined by the processor; and the transmitter 4000 is further configured to send the service flow packet processed by the function module.

In some feasible implementation manners, the foregoing processor 3000 is specifically configured to:

determine, according to the flow table and the service flow packet received by the receiver, multiple function modules for processing the service flow packet; and determine a processing sequence of the multiple function modules according to the flow table and the received service flow packet.

In some feasible implementation manners, the foregoing transmitter 4000 is specifically configured to:

send the service flow packet to the multiple function modules according to the processing sequence determined by the processor.

In some feasible implementation manners, the foregoing transmitter 4000 is specifically configured to:

add, into the service flow packet, a route identifier of the first function module corresponding to the processing sequence determined by the processor, and send the service flow packet to the first function module.

In some feasible implementation manners, the foregoing transmitter 4000 is further configured to:

after the receiver receives a service flow packet processed by any function module, add, into the service flow packet processed by the any function module, a route identifier of a next function module indicated by the processing sequence, and send the service flow packet to the function module corresponding to the route identifier.

In some feasible implementation manners, the foregoing processor 3000 is further configured to:

determine, according to a service requirement of the service flow packet received by the receiver, a type of the function module for processing the service flow packet;

set, in the flow table, a correspondence between an identifier of the service flow packet and the type of the function module; and set, in the flow table, a processing sequence of all types of the function modules according to the service requirement of the service flow packet.

In some feasible implementation manners, the identifier of the foregoing service flow packet includes at least one of a destination IP address, a source IP address, a destination port, or a source port that is of the service flow packet, or a bearer identifier used by the terminal when sending the service flow packet to the access device, where the bearer identifier includes a physical channel identifier or a logical connection identifier.

In some feasible implementation manners, the foregoing processor 3000 is specifically configured to:

query the flow table according to the identifier of the service flow packet received by the receiver, and determine types of the multiple function modules for processing the service flow packet;

search multiple function modules built in the access device for all function modules corresponding to the types of the multiple function modules for processing the service flow packet, and determine statuses of all the function modules; and determine, according to the statuses of all the function modules, each type of function module specifically for processing the service flow packet.

In some feasible implementation manners, the foregoing transmitter 4000 is further configured to:

add a route identifier of each of the function modules determined by the processor into the service flow packet; and send the service flow packet to the first function module corresponding to the processing sequence, and send a service flow packet processed by the first function module to a next function module by using the first function module and according to a route identifier corresponding to the next function module indicated by the processing sequence, to further send a service flow packet processed by the next function module to a next function module by using the next function module and according to the processing sequence and the route identifier.

In specific implementation, the access device described in this embodiment of the present disclosure may perform, by using all the modules (which include the receiver, the transmitter, the memory, the processor, and the like) of the access device, an implementation manner described in the processing method for a service flow packet provided in the embodiments of the present disclosure. For specific implementation manners of all the foregoing modules, refer to steps S101 to S105 in the first embodiment and steps S201 to S208 in the second embodiment of the processing method for a service flow packet provided in the embodiments of the present disclosure. Details are not described herein again.

A person of ordinary skill in the art may understand that all or some of the procedures of the methods in the embodiments may be implemented by a computer program instructing relevant hardware. The program may be stored in a computer readable storage medium. When the program runs, the procedures of the method embodiments may be performed. The foregoing storage medium may include: a magnetic disk, an optical disc, a read-only memory (ROM), or a random access memory (RAM).

What is disclosed above is merely examples of embodiments of the present disclosure, and certainly is not intended to limit the protection scope of the present disclosure. Therefore, equivalent variations made in accordance with the claims of the present disclosure shall fall within the scope of the present disclosure.

What is claimed is:

1. A processing method in an access device for a service flow packet, the access device having a plurality of function modules, the method comprising:

receiving, by the access device, a service flow packet sent by a terminal;

configuring, by the access device, a flow table in real time according to a service requirement of the received service flow packet;

determining, by the access device according to the flow table and the received service flow packet, multiple function modules selected from the plurality of function modules for processing the received service flow packet;

determining, by the access device, a processing sequence of the multiple function modules according to the flow table and the received service flow packet;

adding, by the access device, a route identifier of each of the multiple function modules into the received service flow packet corresponding to the processing sequence;

sending, by the access device, the received service flow packet to a first function module of the multiple function modules corresponding to the processing sequence and the route identifier;

sending, by the access device, a service flow packet processed by the first function module to a second function module of the multiple function modules according to the processing sequence and the route identifier, further sending a service flow packet processed by the second function module to a third function module of the multiple function modules according to the processing sequence and the route identifier;

obtaining, by the access device, a service flow packet processed by at least the first function module, the second function module, and the third function module; and sending, by the access device, the service flow packet to a target node.

2. The method according to claim 1, wherein before determining, by the access device according to a flow table and the received service flow packet, the multiple function modules for processing the service flow packet, the method further comprises:

determining, by the access device according to the service requirement of the received service flow packet, a type of each of the multiple function modules for processing the service flow packet;

setting, by the access device in the flow table, a correspondence between an identifier of the service flow packet and the type of each of the multiple function modules; and setting, by the access device in the flow table, a processing sequence of types of function modules according to the service requirement of the received service flow packet.

3. The method according to claim 2, wherein the identifier of the service flow packet comprises at least one of:
a destination IP address,
a source IP address,
a destination port,
a source port, and
a bearer identifier for use by the terminal when sending the service flow packet to the access device,
wherein the bearer identifier comprises a physical channel identifier or a logical connection identifier.

4. The method according to claim 2, wherein determining, by the access device according to the flow table and the received service flow packet, the multiple function modules for processing the service flow packet comprises:
querying, by the access device, the flow table according to the identifier of the received service flow packet;
searching, by the access device, all function modules corresponding to the types of the multiple function modules, and determining statuses of function modules matching the types of the multiple function modules; and
determining, according to the statuses of the function modules, each type of function module for processing the received service flow packet.

5. An access device, comprising:
a processor;
a receiver configured to, in coordination with the processor, receive a service flow packet sent by a terminal;
a plurality of function modules having one or more specified functions and including at least one of: a virtual function module, and a hardware function module; and
a non-transitory computer readable medium storing instructions, that when executed by the processor, cause the processor to perform the following steps:
configure a flow table in real time according to a service requirement of the received service flow packet;
determine, according to the flow table and the received service flow packet, multiple function modules selected from the plurality of function modules for processing the received service flow packet,
determine a processing sequence of the multiple function modules according to the flow table and the received service flow packet, add a route identifier of each of the function modules into the received service flow packet corresponding to the processing sequence,
process, by a first function module of the multiple function modules corresponding to the processing sequence and a route identifier, the received service flow packet,
process, by a second function module of the multiple function modules according to the processing sequence and a route identifier, a service flow packet processed by the first function module,
process, by a third function module of the multiple function modules according to the processing sequence and a route identifier, a service flow packet processed by the next function module, and
obtain a service flow packet processed by at least the first function module, the second function module and the third function module; and
a transmitter configured to send the service flow packet to a target node.

6. The access device according to claim 5, wherein the steps further comprise:
determine, according to the service requirement of the received service flow packet, a type of each of the multiple function modules for processing the received service flow packet;
set, in the flow table, a correspondence between an identifier of the received service flow packet and the type of each of the multiple function modules; and
set, in the flow table, a processing sequence of types of the function modules according to the service requirement of the received service flow packet.

7. The access device according to claim 6, wherein the identifier of the service flow packet comprises at least one of:
a destination IP address,
a source IP address,
a destination port,
a source port, and
a bearer identifier for use by the terminal when sending the service flow packet to the access device,
wherein the bearer identifier comprises a physical channel identifier or a logical connection identifier.

8. The access device according to claim 6, wherein the steps further comprise:
query the flow table according to the identifier of the received service flow packet;
search all function modules corresponding to the types of the multiple function modules, and determine statuses of the function modules matching the types of the multiple function modules; and
determine, according to the statuses of the function modules, each type of function module for processing the service flow packet.

* * * * *